Dec. 31, 1957     O. E. WATSON     2,818,267
NESTING HAND TRUCK
Filed Feb. 9, 1955                              2 Sheets-Sheet 1
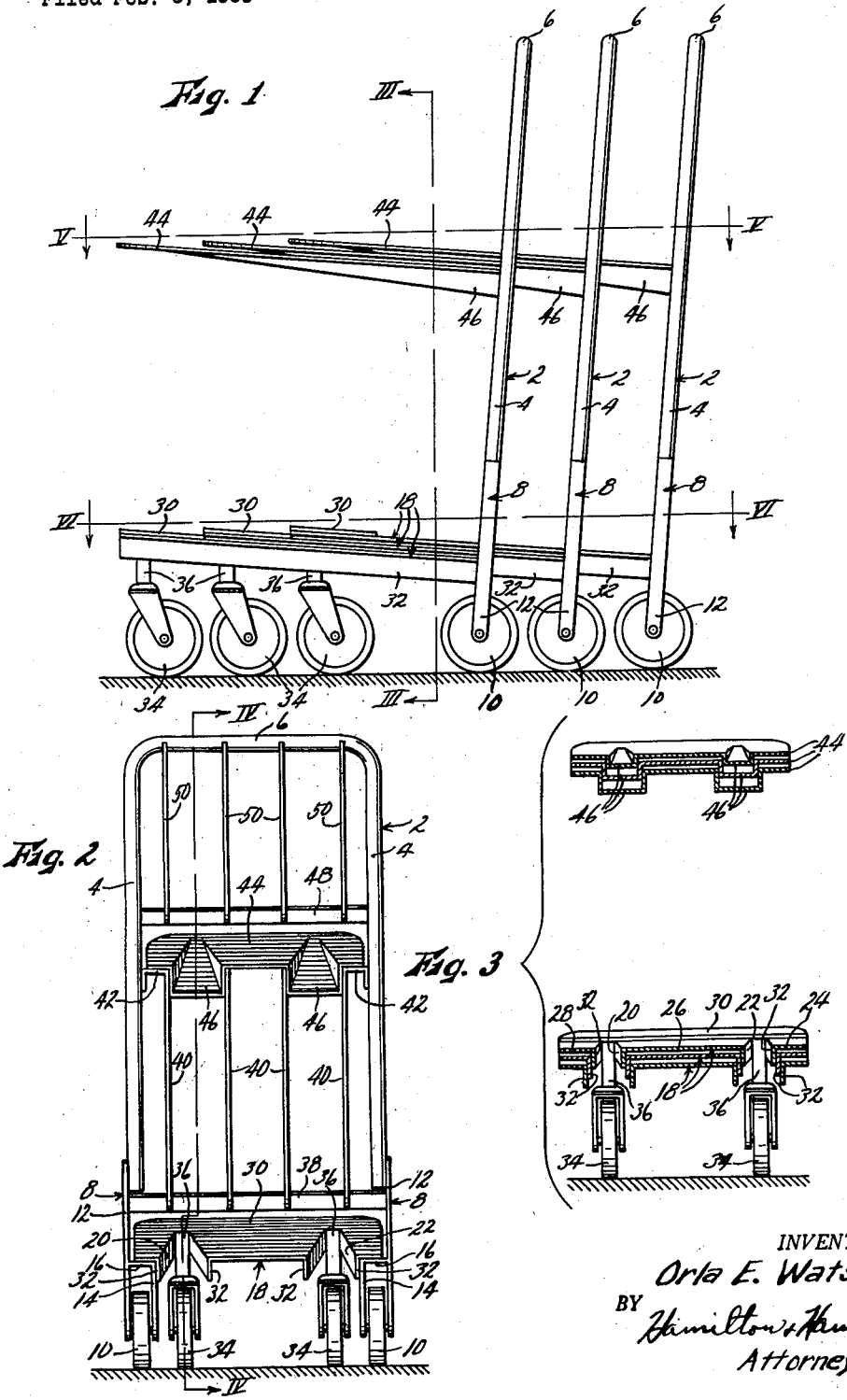
INVENTOR.
Orla E. Watson
BY Hamilton & Hamilton
Attorneys.

Dec. 31, 1957  O. E. WATSON  2,818,267
NESTING HAND TRUCK
Filed Feb. 9, 1955  2 Sheets-Sheet 2

INVENTOR.
Orla E. Watson
BY
Hamilton & Hamilton
Attorneys

United States Patent Office 2,818,267
Patented Dec. 31, 1957

2,818,267

NESTING HAND TRUCK

Orla E. Watson, Mission Hills, Kans.

Application February 9, 1955, Serial No. 487,078

3 Claims. (Cl. 280—33.99)

This invention relates to new and useful improvements in hand trucks, and has particular reference to trucks of the nesting or telescoping type.

The principal object of the present invention is the provision of a hand truck having a flat platform supported by wheels at the forward and rearward ends thereof and an upwardly extending frame at the rearward end thereof, in which said platform slopes upwardly to the front. Heretofore in all such trucks within my knowledge, which are nested by rolling one truck forwardly into the rearward portion of another truck, the platform has always sloped downwardly to the front, in order to extend beneath the platform of the next forward truck. This was done so that the supporting posts or other members attaching the forward wheels to the platform would not have to pass through the platform of the next truck forward. This arrangement was not particularly successful for flat-bedded trucks, since there was a constant tendency for packages or other objects carried thereon to slide off of the forward end of the truck. My invention provides a four-wheeled, flat-bedded, nesting truck in which the bed slopes upwardly to the front, so that packages or the like supported on said bed tend to the rear to rest against the rear frame.

Other objects are the provision of a hand truck of the character described which is very simple and economical in structure, which is very desirable and sturdy, and which is not likely to get out of order, having no moving parts except the wheels.

With these objects in view, as well as other objects which will appear in the course of the specification, reference will be had to the drawing, wherein:

Fig. 1 is a side elevational view of three hand trucks embodying the present invention, shown in nested or telescoped relation.

Fig. 2 is a rear elevational view of the trucks as shown in Fig. 1.

Fig. 3 is a sectional view taken on line III—III of Fig. 1.

Figure 4:
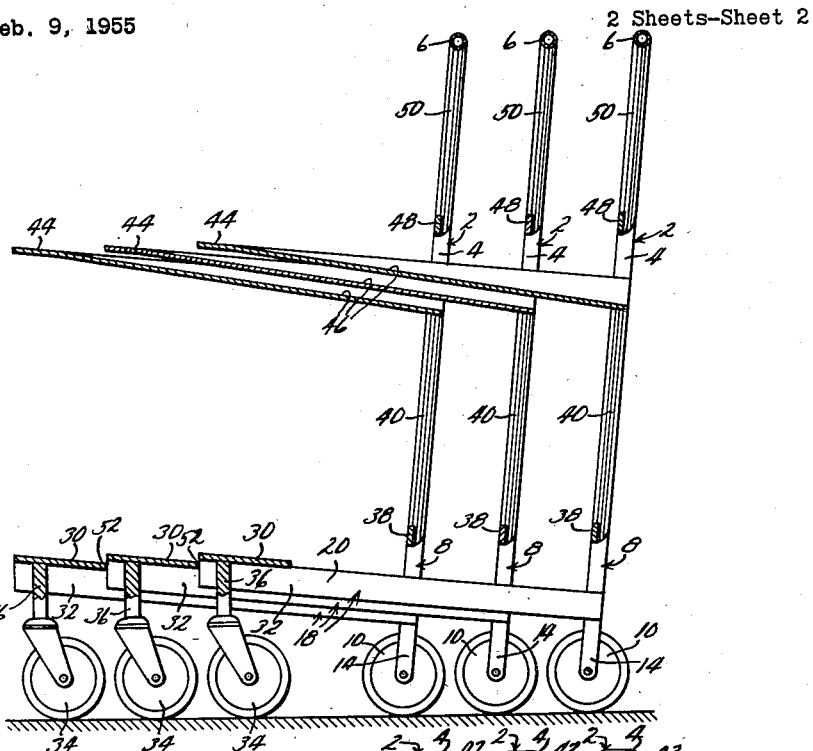
Fig. 4 is a sectional view taken on line IV—IV of Fig. 2, with parts left in elevation.

Like reference numerals apply to similar parts throughout the several views, and the numeral 2 applies to a vertically extending rear frame formed of tubular stock and being of substantially inverted U-shape. It has parallel side bars 4 and a top cross bar 6 which serves as a handle. Welded or otherwise rigidly secured to the lower end of each side bar 4, is the upper end portion of a strap metal bracket 8 having a wheel 10 rotatably mounted between the downwardly extending legs 12 and 14 thereof. The shorter of these legs 14 is connected at its upper end to the midportion of longer leg 12 by a horizontal bar 16 (see Fig. 2).

Figure 6:
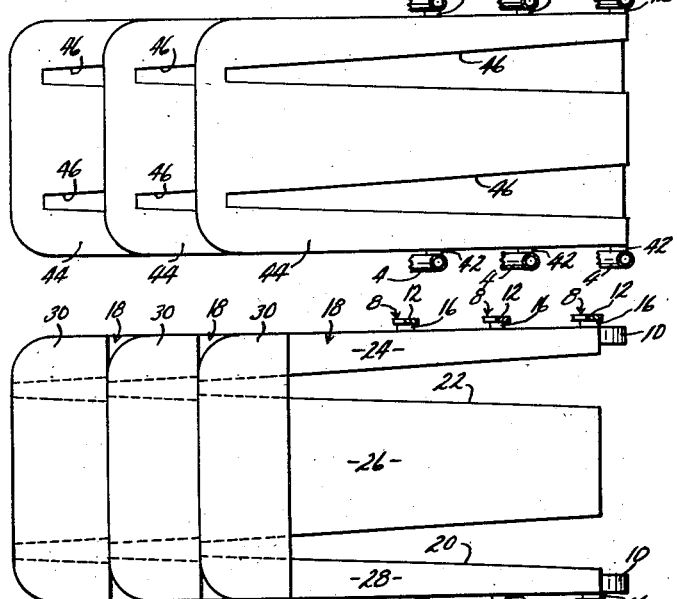
Fig. 6 is a sectional view taken on line VI—VI of Fig. 1.

A substantially flat platform or bed 18 of approximately rectangular form is welded or otherwise fixed at its rearward corners to the horizontal bars 16 of brackets 8, and slopes upwardly and forwardly. The side edges of said bed are spaced inwardly from legs 12 of said brackets, in order that the bed of another cart can pass freely therebetween. Platform 18 has a pair of slots 20 and 22 formed longitudinally therein, said slots being spaced apart laterally of the bed a distance less than the lateral spacing between rear wheels 10. Said slots are open at their rearward ends, and are taperingly narrowed toward their forward ends, terminating in spaced relation from the forward edge of the bed. Obviously such a bed could be formed integrally of a single plate if desired, but as shown slots 20 and 22 extend through the forward edge of the bed, dividing it into three sections 24, 26, and 28 as best shown in Figs. 3 and 6, said sections being rigidly joined by a plate 30 lead transversely across the forward edge of the bed and welded to the sections thereof. The rearward edge of said plate forms the forward ends of slots 20 and 22. The edges of bed sections 24, 26 and 28 adjacent slots 20 and 22 are turned downwardly to present reinforcing flanges 32, said flanges extending to the extreme forward end of bed 18. The forward end of the bed is supported by a pair of wheels 34 each swivelled on a vertical axis to a post 36, the upper ends of said posts being welded or otherwise fixed respectively between the flanges 32 associated with slots 20 and 22. The swivel or castering axes of said wheels hence lie in the midlines of said slots.

A cross bar 38 extends horizontally between and is welded to the upper end portions of legs 12 of brackets 8, at an elevation higher than the forward end of bed 18. A plurality of bars 40 lying in the plane of frame 2 are welded at their lower ends to cross-bar 38 and extend upwardly approximately one-half of the height of said frame. The two bars 40 which lie closest to side bars 4 of the frame are each provided at its upper end with a horizontal portion 42 which extends toward and is welded to the adjacent side bar 4.

Figure 5:
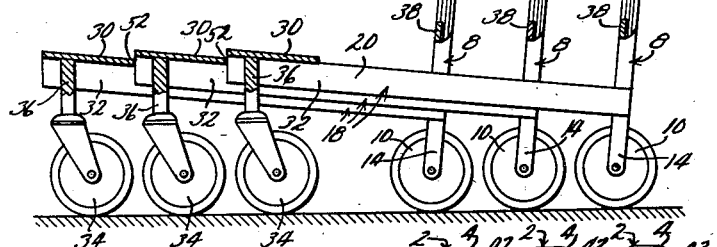
Fig. 5 is a fragmentary sectional view taken on line V—V of Fig. 1.

A substantially rectangular shelf 44, approximately coextensive with bed 18, is welded or otherwise fixed at its rearward edge to the upper ends of bars 40, and to the horizontal bar portions 42, said shelf sloping upwardly to the front in the same manner as bed 18. The side edges of said shelf are spaced inwardly from side bars 4, as shown in Figs. 2 and 5. Shelf 44 is formed with a plurality of channel-shaped grooves 46 for reinforcement. Said grooves are open at their rearward ends, but are taperingly reduced, in both width and depth, toward their forward ends.

A cross-bar 48 extends horizontally between and is welded to frame side bars 4 at an elevation higher than the forward edge of shelf 44. A plurality of bars 50 lying in the plane of frame 2 are welded at their lower ends to cross-bar 48, and at their upper ends to the top cross-bar or handle 6 of the frame. The bars 40 and 50 constitute, in skeleton form, walls which prevent packages or the like deposited on bed 18 or shelf 44 from sliding off of the rearward edges thereof. The vertical space between cross-bar 38 and the rearward edge of bed 18, and between cross-bar 48 and the rearward edge of shelf 44, constitute windows permitting respectively the telescoping entry of the bed 18 and shelf 44 of another truck therein, when the carts are nested as shown to occupy a minimum of floor space. The telescoping movement of one truck into another is arrested when the forward ends of flanges 32 of the rearward cart strike the rearward edge of plate 30 of the forward cart, as indicated at 52 in Fig. 4. The spacing between successive trucks is thus determined by the width of plate 30, and should be sufficiently great to prevent contact of or interference between the wheels of the trucks. The transverse spacing between front wheels 34 is sufficiently less than the spacing between rear wheels 10 as to permit said front wheels of one truck to pass between the rear wheels of another truck.

As the trucks are telescoped, the bed 18 and shelf 44 of each truck, due to its slope, extends above the corresponding member of the next truck forward. At the same time, channels 46 of shelf 44 enter the corresponding channels of said next forward truck, the side walls of said channels being telescoping by virtue of the fact that the channels are tapered in width. Also as the trucks are telescoped, the support posts 36 of the front wheels of the rearward truck enter and move forwardly through the slots 20 and 22 of bed 18 of the forward truck. Said posts therefore must have a transverse thickness less than the minimum width of said slots. Also, it is apparent that if the beds 18 were made of a planar sheet without flanges 32, slots 20 and 22 could be straight. They must, however, be tapered to accommodate said flanges. The reinforcing provided by said flanges is particularly important to central section 26 of the bed, since this section necessarily has the form of a cantilever beam supported from its forward end.

While I have shown and described a specific embodiment of my invention, it will be apparent that many minor changes of structure and operation could be made without departing from the spirit of the invention as defined by the scope of the appended claims.

What I claim as new and desire to protect by Letters Patent is:

1. A hand truck capable of telescoping within another like truck, said truck comprising a substantially upright planar rear frame arranged transversely to the line of travel of said truck, a pair of transversely spaced apart wheels carried at the lower end of said frame, a substantially planar bed fixed at its rearward edge in said frame and sloping upwardly toward its forward edge, and a pair of transversely spaced apart wheels carried beneath the forward portion of said bed and mounted thereto by means of vertically extending posts, the spacing between said front wheels being less than that between said rear wheels, said bed having a pair of slots formed therein parallel with the line of travel of said truck and respectively in alignment with the mounting posts of said front wheels, said slots opening through the rearward edge of said bed, and said rear frame having a window formed therethrough extending upwardly from the rearward edge of said bed and being of greater vertical height and transverse width than said bed.

2. A hand truck as set forth in claim 1 wherein said bed is formed to present a downturned flange along the edges of the slots formed therein, and wherein said slots are tapering widened toward their rearward ends, whereby to permit telescoping of the flanges with the corresponding flanges of a like hand truck.

3. A hand truck as set forth in claim 1 with the addition of a shelf fixed at its rearward edge in said frame in spaced relation to said bed, and inclined similarly to said bed, and wherein said rear frame has a second window formed therein extending upwardly from the rearward edge of said shelf, and being of greater vertical height and transverse width than said shelf, said shelf being formed to present a reinforcing channel therein extending forwardly from the rearward edge thereof, said channel being taperingly reduced in width toward the forward end thereof.

References Cited in the file of this patent

UNITED STATES PATENTS

| 1,911,224 | Dellert | May 30, 1933 |
| 2,004,934 | Dellert | June 18, 1935 |
| 2,479,530 | Watson | Aug. 16, 1949 |
| 2,639,161 | Goldman | May 19, 1953 |
| 2,738,201 | Spears | Mar. 13, 1956 |

FOREIGN PATENTS

| 661,981 | Great Britain | Nov. 28, 1951 |